United States Patent
Nussbaum et al.

[11] 3,780,969
[45] Dec. 25, 1973

[54] WING CASE FOR AIR FOILS

[75] Inventors: Helmut Nussbaum, Bremen; Hilmar Schnell, Delmenhorst, both of Germany

[73] Assignee: Vereinigte Flugtechnische Werke-Fokker GmbH, Bremen, Germany

[22] Filed: Feb. 29, 1972

[21] Appl. No.: 230,236

[30] Foreign Application Priority Data
Mar. 2, 1971  Germany.................. P 21 09 692.4

[52] U.S. Cl. ............................................... 244/123
[51] Int. Cl. ......................... B64c 3/20, B64c 3/26
[58] Field of Search ....................... 244/123, 124; 161/55, 57, 59

[56] References Cited
UNITED STATES PATENTS
1,891,941  12/1932  Messerschmitt.................... 244/123
2,901,455  8/1959   Jurras................................. 161/59

FOREIGN PATENTS OR APPLICATIONS
2,032,283  3/1971   Germany........................... 244/123

Primary Examiner—George E. A. Halvosa
Assistant Examiner—Charles E. Frankfort
Attorney—Ralf H. Siegemund

[57]  ABSTRACT

Wing case for air foils with a closed profile shell of laminated plastic reenforced preferably by boron fibers with different orientation; flanged bars as spars sandwich the shell at corners and being bonded thereto. Aluminum ribs are in the shell, the spars are preferably made of titanium, the numbers of lamina with fiber orientations in direction of wing span and ribs correspond to the differences in elastic properties of the two metals used for ribs and spars.

3 Claims, 4 Drawing Figures

PATENTED DEC 25 1973 3,780,969
SHEET 1 OF 2

WING CASE FOR AIR FOILS

The present invention relates to a wing case for air foils, and here particularly to the composite construction of such a case which includes metal fiber reenforced material.

It is known generally to make parts of an aircraft from fiber-reenforced laminated material. This material is used for some of those components which have to have great strenght and rigidity. Particularly, rudders have been constructed for test purposes from plastic which is reenforced by boron fibers. The rudder was particularly constructed under utilization of the so called sandwich construction principle, wherein a conventional titanium frame is covered with such plastic sheathing having boron fibers for reenforcement and being of laminated construction. Such boron fiber reenforced plastic in sandwich construction has been tentatively used also in other portions of an aircraft.

These various contemplated and actual uses of such fiber reenforced plastic is directed only toward a mere substitute or replacement for metal shell parts and sheathing. It has not been taken into consideration that the physical properties of these sheaths, such as elastic moduli and coefficient of thermal expansion are variable over wide ranges and can be made to depend on fiber orientation and combination. It is an object of the present invention to provide fiber reenforced laminated plastic sheathing that is constructed in particular relation to the metal parts used in addition and in composite, structural configuration with the sheathing. Considering particularly the construction of a wing case in an aircraft, the overall construction is to take into consideration that fiber reenforced laminated plastic sheathing as anisotropic properties; fiber technology and the physical properties of the metal parts as they are to be used in the composite construction are to be mutually optimised.

In accordance with the preferred embodiment of the present invention, a wing case to to be constructed as follows. A shell is to be made of closed profile in cross section, using fiber reenforced laminated plastic sheathing (matrix material) to serve as top and bottom of the wing case as well as web of spar. Particularly, profiled metal bars are bonded to the shell to serve as spar flanges whereby such a spar flange equivalent is divided into inner and outer flanges, "inner" and "outer" understood in relation to the closed shell. The ribs in the wing are to be made of metal. Ribs and bars serving spar flanges may be made from different metals (e.g., aluminum and titanium respectively). Accordingly, the modules of elasticity of the shell in wing span direction and transversely thereto are matched to the corresponding modules of these metal parts. For this, the lamina of different fiber orientation are selected in number so as to obtain the desired relative elastic moduli in the different directions.

Additional lamina with obliquely transverse fiber orientation may be provided to obtain more graduated transition in the several properties as far as change with direction is concerned.

For aluminum ribs and titanium spars and boron fiber reenforced plastic, the numbers of lamina used should be related as follows. Some lamina have their fibers oriented in direction of extension of the spars or wing span (called the 0° orientation). Others have their fibers oriented at right angles thereto, i.e., in direction of the ribs (called the 90° orientation). Still others have their boron fibers oriented at +45° or −45° to either direction. Let the number of layers be respectively $t_0$, $t_{90}$, $t_{45}$, these numbers should be related by $$t_0 : t_{90} : t_{45} = 2 : 1 : 2$$

under the additional assumption that the laminated sheathing is layered symmetrical to a center plane. The total number of layers, having their reenforcing fibers oriented in particular direction, is, of course, the equivalent of the relative thickness of fiber-laminate in the sheathing with fibers oriented in that direction, because all layers or lamina are deemed to have similar thickness.

It should be noted that such fiber reenforced plastic sheathing is quite expensive, but a composite construction as suggested here permits a relative weight reduction by 30 percent which more than offsets the high cost of the material. Also, a wing constructed in that manner permits almost completely undisturbed uniform thrust drop off in the closed shell, making full use of fiber technology, particularly as to force distribution and force transmission between wing case and connecting structure.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
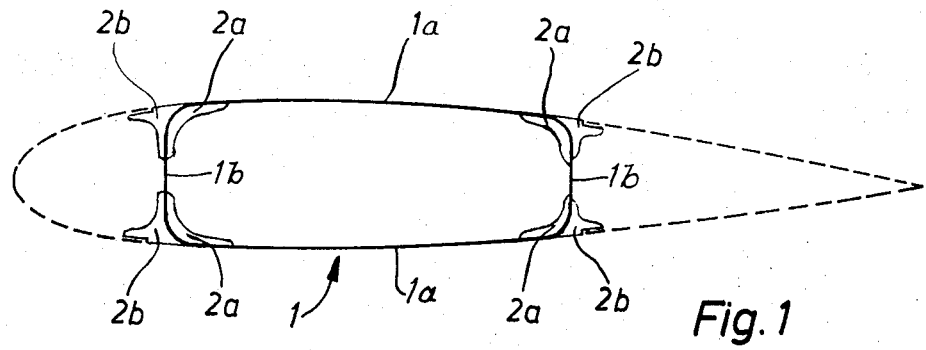
FIG. 1 illustrates schematically a section view through a wing, showing the principle arrangement of parts in accordance with the invention.
Figure 2:
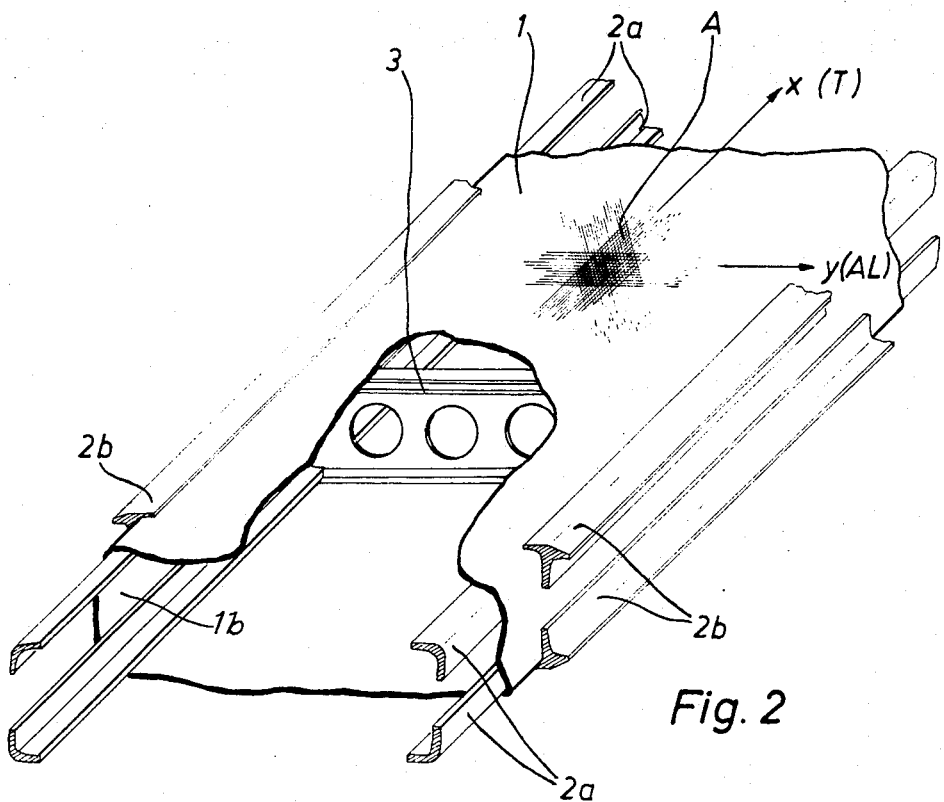
FIG. 2 illustrates a perspective view of the wing case of FIG. 1, showing greater detail of the relevant components involved.

Proceeding now to the detailed description of the drawings, FIGS. 1 and 2 illustrate the shell construction of the body of a wing or wing case. Reference numeral 1 refers to the shell which is composed of laminated, fiber-reenforced material. Plural layers of lamina are included in a sheet wherein the individual layers differ as to fiber orientation including particularly transversely oriented layers and lamina (matrix material). The spar flanges for the wing case are constructed under utilization of particularly profiled bars made of titanium. These spar flanges are arranged in pairs (2a, 2b) to sandwich and to curve the shell. Each divided spar is thus comprised of an inner flanged bar 2a and an outer flanged bar 2b, having shell 1 sandwiched in between. The terms "inner" and "outer" relate here to the section profile of the shell as a whole.

The spar structure provided for the transition of the wing or air foil top and bottom portions 1a of the shell to the portion 1b that constitute parts of the web of spar structure. Each outer flanged spar may be divided additionally, depending upon the connecting structure for the wing. As shown in FIG. 2, ribs 3 can be provided inside of shell 1; the ribs are usually made from material different from the material of the flanged spars (e.g., aluminum).

The area A in FIG. 2 refers particularly to a more detailed illustration of the fiber orientation within the several lamina of shell 1. Some metal fibers in their respective plastic lamina extend in direction X (called 0°-orientation for the fibers), which is the direction of the span of the wing and of the spar structure accordingly. Other fibers extend in direction Y (called 90° orientation), which defines the extension of the ribs. Additional layers have their fibers oriented at + 45° to the X and Y axes as defined, and still further layers have their fibers oriented at 90° thereto (i.e., −45° to the X/Y axes as defined).

Assuming that titanium is used for the several spars $2a$ and $2b$, and assuming further that ribs 3 are made of aluminum, a rule should be observed according to which the number $t_0$ of lamina in shell 1 with 0° fiber orientation is to be twice as large as the number $t_{90}$ of layers and lamina with 90° fiber orientation. The total number $t_{45}$ of layers with ± 45° fiber orientation should correspond to the number of layers with 0° fiber orientation. In other words, the relationship $t_0 : t_{90} : t_{45} = 2 : 1 : 2$ should be observed upon construction the sheathing that will constitute shell 1.

Figure 3:
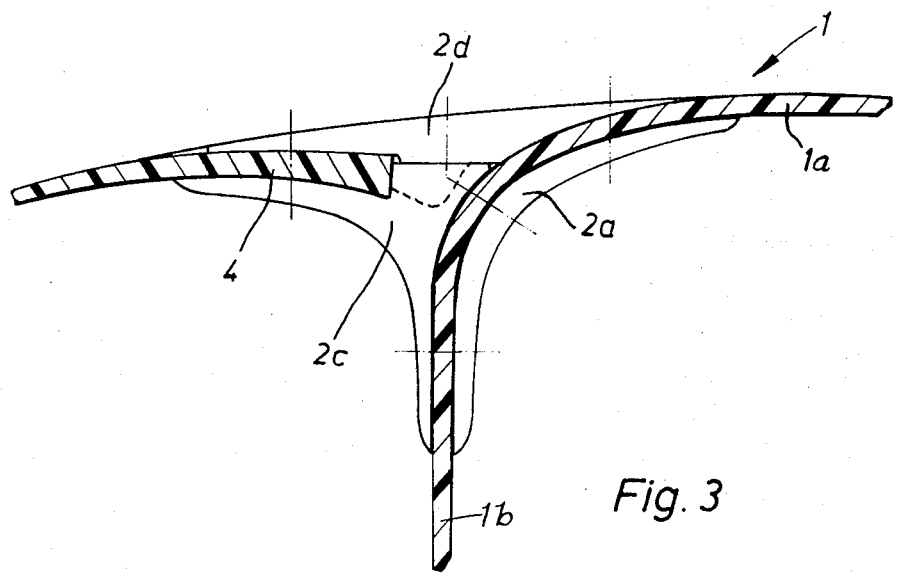
FIG. 3 shows a section through spar construction for connecting the leading edge construction of the wing to the wing case, using a combined friction and positive lock.

FIG. 3 shows a first example for the divided structure for the spar flanges as establishing the transition between shell portion $1a$ to the shell portion $1b$ that constitutes part of the web of spar structure. The spar flanges in particular are constructed for releasable frictional form, closed and flush connection of wing case shell 1 to the wing structure that establishes the leading edge, nose box or case 4. The nose case 4 is provided as a releasable unit, just as the end cases usually are. The inner flanged bar $2a$ of the spar flange, as well as a portion of the outer flanged bar $2c$ of the spar flange, are bonded to shell 1. In accordance with the definition of terms inner and outer, a releasable cover $2d$ pertains to the outer spar portion and is bolted to that outer spar $2c$. Cover $2d$ provides for smooth contour transition as between, e.g., wing case top and the upper part of the nose case that becomes the leading edge. Cover $2d$, as so combined with bar $2c$, provides positive connection between nose case 4 and the laminated shell 1. Case 4 itself may also be of composite construction.

Figure 4:
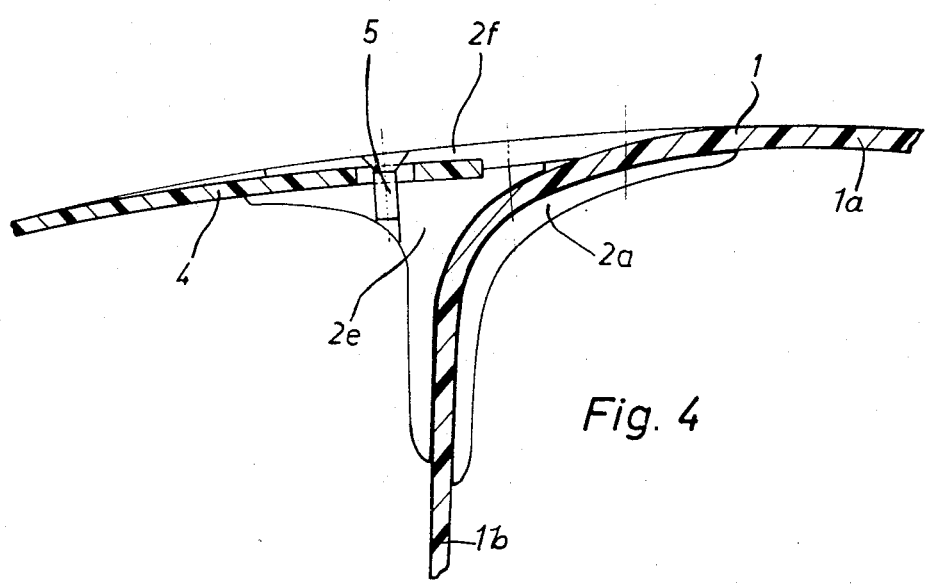
FIG. 4 shows modified connection of wing nose to wing case by means of bolting.

FIG. 4 illustrates a different tri-parted spar construction, including inner spar $2a$ as before, strap or cover plate $2f$ and flanged bar or outer spar flange $2e$. The shell 4 for the leading edge of the wing is bolted between the releasable plate or cover $2f$ and the flanged bar $2e$ which, in turn, is bonded to shell 1. Inner spar flange $2a$ is also bonded to shell 1 as before, and may be riveted or bolted additionally to outer spar flange $2e$.

The web of spars $1b$ may actually be completely enclosed by inner and outer spar flanges. In other words, top and bottom spar flanges may actually be combined, but in pairs so as to establish inner and outer spar flanges in relation to shell 1, each traversing the thickness dimension of the wing in its entirety, if that dimension is relatively small. The wing case can be manufactured in accordance with the following procedures.

A dummy core is made to have outer contour matching the inner contour of the shell to be made. Next, layer upon layer is disposed thereon, using so-called Preprej-tapes or winding single thread or other tapes of fiber-reenforced material thereon, until a completely closed laminated shell has been constructed. Upon providing the laminated structure, the rules for fiber orientation can readily be observed. The core may be of collapsible construction, holding also the ribs 3 and the inner spar flanges $2a$, so as to establish their position relative to the case.

As the fiber-reenforced material cures the ribs and the several spar flanges are bonded to top and bottom shell portions. After removing the collapsible supporting core structure, a tubular case has been made that includes all of the internal components for such a wing shell with spars. Further working may proceed from the outside.

In accordance with another manufacturing method, pressure is employed. A (somewhat smaller) core is covered with an inflatable shell made from a thin foil. The inner spar flanges are disposed in proper position on that shell. Next, the fiber reenforced material as described is placed thereon to obtain the laminated structure that will ultimately constitute shell 1. The fibers in the several lamina as so disposed have the required orientation. Next, the entire structure as made thus far is placed into a mold structure whose contour is the complement or negative profile of the wing case to be made. Now, the inflatable shell is inflated by feeding pressurized air into space between that shell and the core. The pressure as so applied is instrumental in curing the plastic, whereby concurrently the inner spar flanges are bonded to shell 1. The ribs 3 are bonded to the interior of the shell after removing core and inflatable shell, through the open front ends of the wing case. The bonding pressure needed here is locally applied, using tooling that works also on the principle of inflation to obtain the required pressure force acting on the parts to be bonded.

The invention is not limited to the embodiments described above but all changes and modifications thereof not constituting departures from the spirit and scope of the invention are inteded to be included.

I claim:
1. Wing case for air foils, comprising:
    a shell of closed profile in cross section made of laminated plastic, reenforced by fibers oriented in a first plurality of lamina in direction of the wing span, the fibers being oriented differently in a second plurality of lamina, the shell establishing top and bottom portions of the wing as well as webs or spar;
    a plurality of flanged metal bars as spar flanges arranged in pairs inside and outside of the shell and being bonded thereto; and
    metal ribs disposed inside of the shell, wherein different metals are used for the ribs and the bars, the fibers in the second plurality of lamina being oriented in direction of the ribs, the number of lamina of the first plurality with fibers oriented in direction of the wing span differs from the number of lamina of the second plurality with fibers oriented in direction of the ribs so that the modules of elasticity thereof in the directions of the wing span and of the ribs differ correspondingly to the differences in modules of elasticity of the two metals.

2. Wing case as in claim 1, there being a third plurality of lamina having their fibers oriented at ±45° to either said directions.

3. Wing case as in claim 2, wherein the shell is constructed of lamina with boron fiber reenforced plastic, the bars made of titanium, the ribs made of aluminum, the numbers of layers of said first, second and third pluralities of lamina related by 2 : 1 : 2.

* * * * *